April 25, 1939.  E. C. S. CLENCH  2,155,529
LIQUID PRESSURE REMOTE CONTROL SYSTEM
Filed Feb. 4, 1937  3 Sheets-Sheet 2
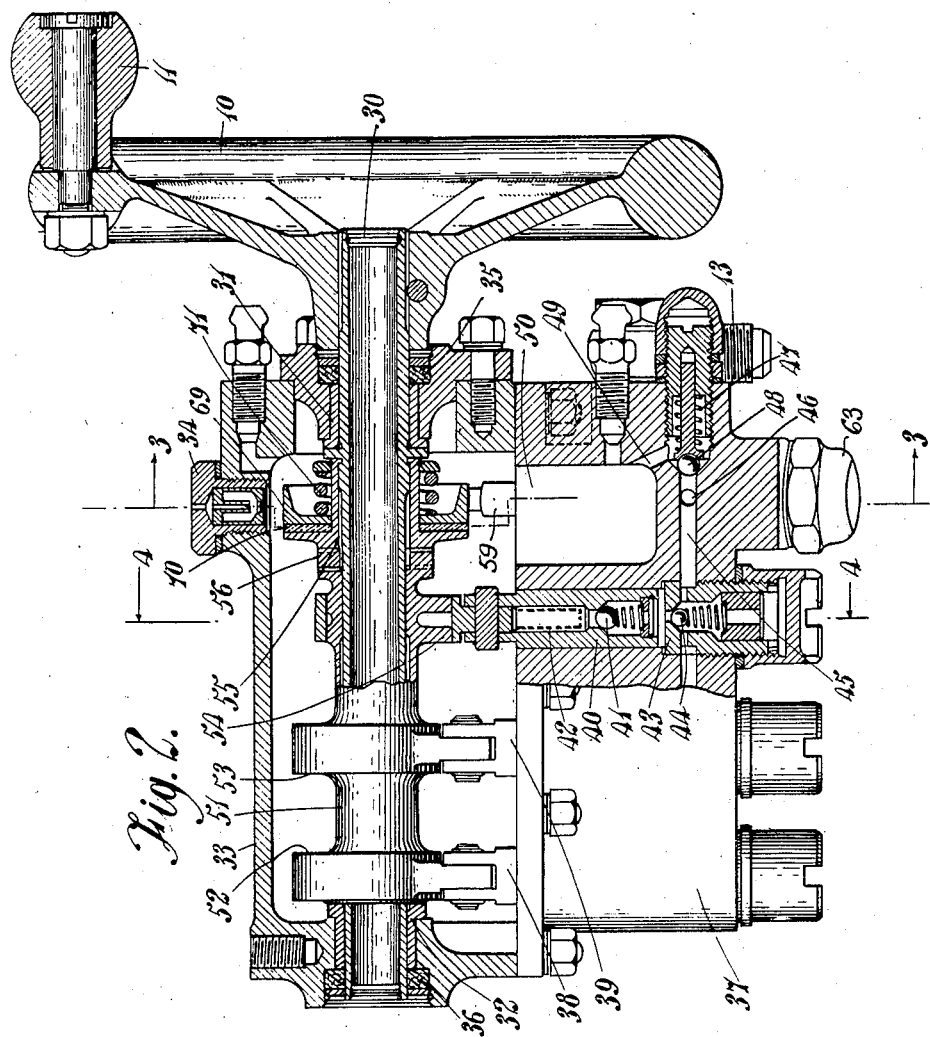
INVENTOR
E.C.S. Clench.
By Lacey & Lacey,
Attys April 25, 1939.  E. C. S. CLENCH  2,155,529
LIQUID PRESSURE REMOTE CONTROL SYSTEM
Filed Feb. 4, 1937  3 Sheets-Sheet 3
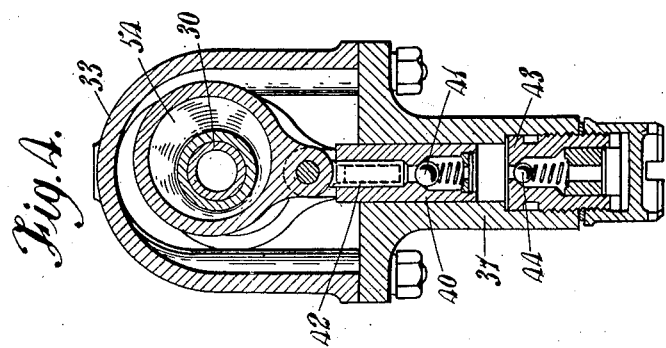
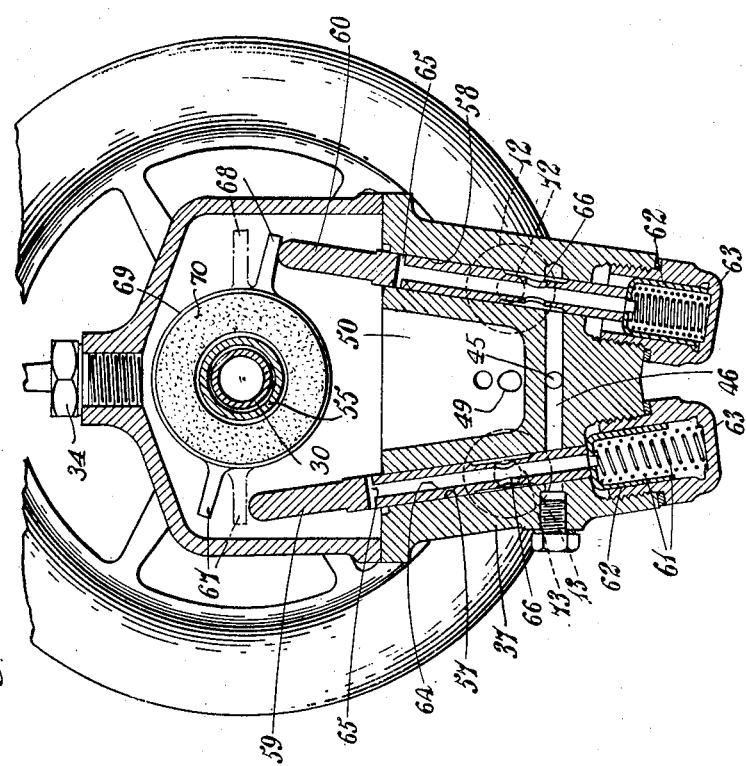
INVENTOR
E. C. S. Clench.
By Lacy & Lacy,
Attys.

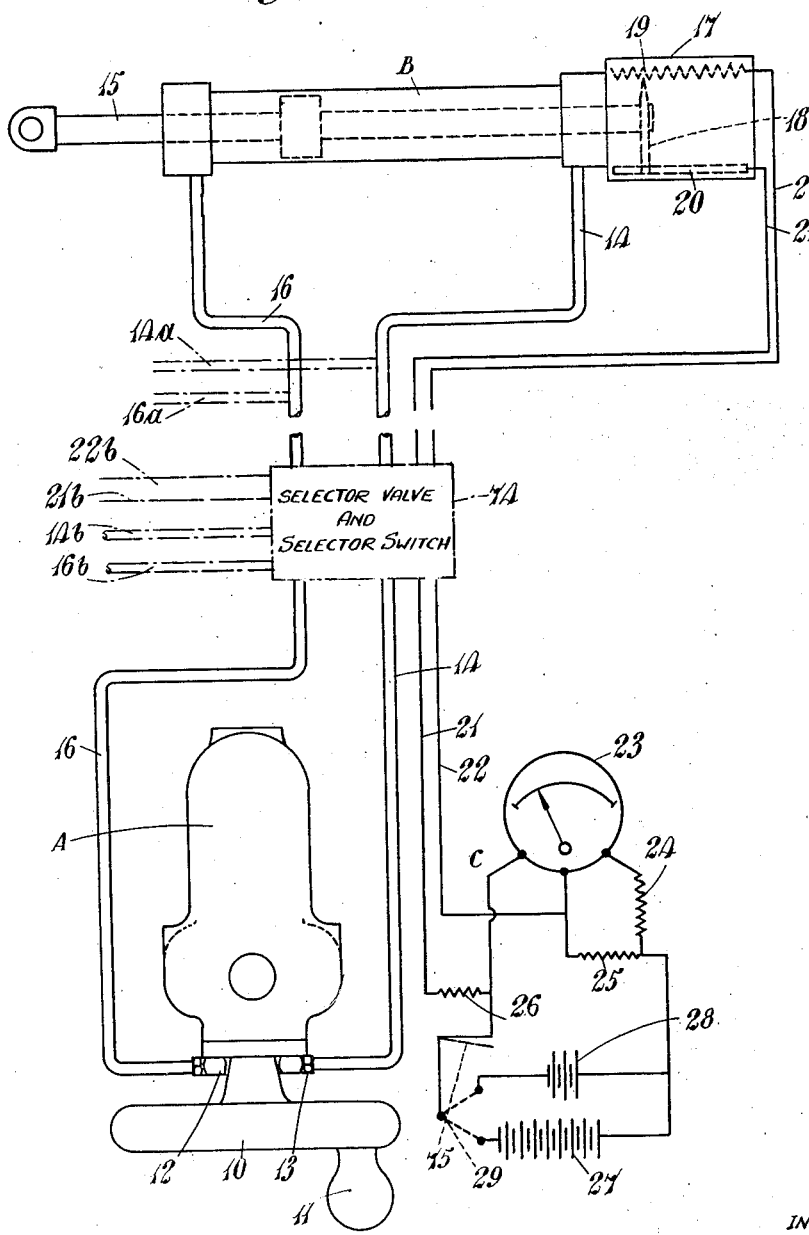

Patented Apr. 25, 1939

2,155,529

UNITED STATES PATENT OFFICE 2,155,529

LIQUID PRESSURE REMOTE CONTROL SYSTEM

Edward Claude Shakespeare Clench, Leamington Spa, England, assignor to Automotive Products Company Limited, London, England Application February 4, 1937, Serial No. 124,153
In Great Britain February 5, 1936

4 Claims. (Cl. 103—2)

This invention relates to liquid pressure control systems, and it has for its object to provide an improved form of system which is arranged to be capable of actuating a number of remotely disposed motor units in a simple and reliable manner, the component parts of the system being capable of being designed so that the whole system is exceptionally light in weight. It is, therefore, particularly applicable for use in controlling the various movable parts of aircraft.

The improved liquid pressure remote control system accordingly comprises in combination a transmitter pump, a valve arranged to conduct the pressure liquid into one or other of a pair of pipe lines, a double-acting fluid motor unit, and an indicating device arranged independently of the pipe lines to indicate at a position adjacent the transmitter unit, the prevailing setting of the fluid motor. It will be appreciated that instead of a double-acting motor unit, a pair of opposed single acting units may equally well be employed and the term "double-acting" as hereinafter used is intended to embrace this modification. Where the transmitter pump is actuated by a rotary handle the direction of movement of the latter may conveniently serve to determine into which of the pipe lines the pressure liquid is delivered, thus simplifying the operation of the system. By suitably modifying the valve the transmitter unit can readily be arranged so that when the system is in a static condition both pipe lines are in communication with a reservoir, the motor unit, or at least one of them where a plurality of such units is provided, preferably being fitted with self-locking means which are released automatically by the pressure liquid received from the transmitter unit.

The indicating means is preferably of an electrical nature, and may conveniently comprise a variable resistance actuated by the motor unit and an indicator of the ohm-meter type remotely connected therewith. A single electrical indicating device may be arranged, if desired, to indicate the prevailing position of any one of the motor units in cases where a single transmitter pump is adapted to operate a plurality of motor units or sets of motor units as determined by a selector valve.

The transmitter of the improved liquid pressure remote control system, preferably has an operating spindle which when rotated is arranged to close a by-pass valve connected with that pipe line receiving the pressure liquid, the other pipe line remaining in communication with the reservoir so as to return to the latter the liquid received from the motor unit being reset. For this purpose the by-pass valve may conveniently be actuated through the medium of a friction clutch which slips during the normal rotation of the pump spindle.

One form of system according to the invention is illustrated as an example in the accompanying drawings, in which latter Figure 1 is a diagrammatic plan, including the electrical connections of the indicating device;

Figure 2 is a part sectional side elevation showing the construction of the transmitter unit;

Figure 3 is a rear sectional elevation on the line 3—3 of Figure 2, one of the by-pass valves being closed; and Figure 4 is a front sectional elevation on the line 4—4 of Figure 2.

Referring firstly to Figure 1, the improved system comprises a transmitter unit A in the form of a pump, which is actuated by means of a hand wheel 10 having a handle 11 for fast operation. The transmitter unit is fitted with two connections 12 and 13, and is arranged so that when the wheel 10 is rotated in a clockwise direction liquid from a self-contained reservoir is delivered through the connection 13 and thence passes by way of a pipe line 14 to the right hand end of a motor unit indicated at B, thus causing the piston rod 15 of said unit to be moved towards the left. At the same time liquid rejected by the motor unit B passes through a pipe line 16 and enters the connection communicating with the said self-contained reservoir, which will be hereinafter described. By reversing the rotation of the hand wheel 10 the pressure liquid is discharged into the pipe line 16, while in these circumstances the liquid rejected by the motor unit B returns to the reservoir through the connection 13. When the operator lets go of the handle 11 both the connections 12 and 13 are automatically placed in communication with the reservoir.

It is apparent from the above that the position of the hand wheel 10 does not give an accurate indication of the setting of the motor unit B i. e. the position occupied by the piston rod 15, and an electrical indicating device is therefore incorporated in the system for showing at a position adjacent the transmitter unit A an indication of the prevailing setting of the motor unit B. For this purpose the piston rod 15 is arranged to actuate a variable resistance device incorporated in a casing 17 attached to the motor unit B, a finger 18 conveniently being arranged to travel along a resistance element 19 as well as a contact strip 20, so that the resistance between a pair of wires 22 and 21 connected with the resistance 19 and the strip 20 depends upon the setting of the motor unit. These two wires 21 and 22 extend to an indicating device C disposed adjacent the transmitter A, and comprising a moving coil ohm-meter 23 having associated resistances 24, 25 and 26, said meter being fed with current from either a battery 27 for normal use or a stand-by battery 28 according to the position of a two-way switch 29. In its intermediate position the switch 29 is "off" and thus puts the indicator 23 out of action. Where the system is used on air- or watercraft or on a vehicle the usual lighting or other battery employed for the normal operation of said craft or vehicle would be connected at 27, and the battery 28 need only comprise a few small dry cells.

The construction of the transmitter unit is shown in Figures 2, 3 and 4, from which it will be seen that the hand wheel 10 is firmly attached to a tubular spindle 30 mounted at its two ends in bearings 31 and 32 respectively carried in the end walls of a cam chamber 33 which serves also as the reservoir for working liquid. A combined filler plug and vent indicated at 34 is provided for enabling the liquid supply to be replenished, while packing washers 35 and 36 prevent the escape of liquid past the ends of the spindle 30.

The lower part of the transmitter is constituted by a cylinder block 37 which is bored vertically for the reception of three plungers 38, 39 and 40, each of which is drilled axially for the reception of a non-return spring-pressed inlet ball valve 41 and a cup-shape filter element 42. The lower part of each cylinder bore is closed by a plug 43 accommodating a non-return delivery valve 44 adapted to discharge liquid into a longitudinal passage 45, which at the front of the unit communicates with a transverse passage 46. A safety valve indicated at 47 prevents the delivery pressure exceeding a predetermined value, the safety valve ball 48 being arranged to open when the pressure in the passage 45 reaches a predetermined value and thus allows the liquid to flow through a passage 49 back into a space 50 constituting part of the reservoir.

For actuating the plungers 38, 39 and 40 a sleeve 51 is freely rotatable upon the spindle 30, and is formed with three eccentrics 52, 53 and 54, the straps of which are pivoted to the respective plungers 38, 39 and 40, as will be seen in Figure 4. For driving the sleeve 51, the latter is formed at one end with a series of axially directed teeth which coengage with corresponding teeth in a collar 55 secured firmly to the spindle 30, said teeth thus forming a dog clutch which is indicated at 56 and being arranged to have a relatively large amount of rotational backlash.

At the front of the unit i. e. the right hand part as seen in Figure 2, the cylinder block 37 is formed with a pair of relatively inclined bores 57 and 58 accommodating slidable valve members 59 and 60 respectively, each of which is urged upwardly by means of a pair of springs 61 acting upon a cup member 62, which latter in turn is slidable within a closure cap 63. The bores 57 and 58 intersect the two end portions of the transverse passage 46, while each of the two valve member 59 and 60 is drilled longitudinally as indicated at 64 and transversely at 65, the passage so formed being at all times in communication with the exterior of a waist portion 66 by means of one or more holes as shown.

The upper ends of the two valve members 59 and 60 coact with ears 67 and 68 extending radially from a valve-actuating member 69 which is freely rotatable upon the bush 55, but is normally held in firm frictional engagement therewith by means of a friction ring 70 and a coiled compression spring 71, the arrangement being such that when the hand wheel 10 is rotated in either direction the valve-actuating member 69 tends to be moved also, the parts being adapted to slip when movement of the member 69 is arrested. The two connections 12 and 13 for the pipe lines terminate in ports 72 and 73 respectively in the bores 58 and 57 respectively, these being in line with the waisted portions 66 at all positions of each valve.

The action of the valves will be clear from Figure 3, which shows in broken lines the position of the valve-actuating member when the transmitter unit is inoperative, both of the valve members 59 and 60 being completely elevated. In this position the two pipe line connections 12 and 13 are placed in communication with the reservoir through passages 64 and 65, thus allowing the pipe lines to breathe freely. When the hand wheel 10 is rotated in say a clockwise direction as viewed in Fig. 3, the initial movement is transferred to the valve-actuating member 69, and causes the ear 68 to depress the valve member 60 until the cup 62 engages the bottom of the cap 63, in which position the passage 65 is closed by the end of the bore 58 and the passage 46 is placed in communication with the waist portion 66. Continued rotation of the hand wheel 10 is permitted by the slipping of the friction disc 70, but this motion is imparted through the dog clutch 56 to the eccentric sleeve 51, thus reciprocating the pistons 38, 39 and 40. The pressure liquid delivered through the passage 46 passes around the waisted portion 66 of the valve member 60, and is thence delivered to the pipe connection 12 in the pipe line 16. In the meantime liquid returned from the motor unit through the pipe line 14 enters the transmitter unit through the connection 13, passes into the central passage 64 of the valve member 59 and is returned to the reservoir.

When the resetting movement hase been effected and the handle 11 let go of, the springs 61 of the valve member 60 push the latter upwardly and so return the valve-actuating member 69 to its central position, at the same time rotating the hand wheel 10 through a corresponding angle. This movement, however, is not transmitted to the eccentrics owing to the backlash in the dog clutch 56. When the hand wheel 10 is moved in the reverse direction the operation is the same, the ear 67 being moved downwardly instead of upwardly, thus shifting the valve member 59 and causing the pressure liquid to be delivered through the pipe connection 13.

A single transmitter unit of the form shown can, of course, be utilized for actuating simultaneously a plurality of motor units, in which case branch pipe lines indicated at 14a and 16a would be provided for feeding the second and any subsequent motor units. In these circumstances it is usual for the motor units to be connected together mechanically or otherwise so as to ensure that their resetting movements shall correspond, and therefore a single resistance box 17 may serve for indicating the general position of the series of motor units.

In a development of the invention, however, a selector valve is incorporated and is indicated at 74 in Figure 1, this valve being arranged so that by manipulating suitable control means (not shown) the pipe lines 14 and 16 can be disconnected from the motor unit B and placed in communication with the pipe lines 14b and 16b leading to an alternative motor unit (not shown). Similarly, the wires 21 and 22 are disconnected from the resistance box 17, and are joined with wires 21b and 22b leading to a resistance box (not shown) associated with the aforementioned alternative motor unit. In order to prevent the instrument 23 from fluctuating violently during the change over the battery circuit is preferably opened, as for example by means of a switch 75 operated automatically by the selector valve 74, said switch 75 being again closed when the necessary circuit changes have been made. Such a combined selector valve and selector switch may, per se, be of the form shown in Fig. 3 of Patent No. 2,029,243 of F. Linder, granted January 28, 1936 or of any other conventional form.

What I claim is:

1. In a liquid pressure remote control system, the combination with a pair of pipe lines of means including a liquid reservoir, and a transmitter pump for energization of said pipe lines, valve means including a pair of valve members for placing said pump in communication with a selected one of said pipe lines, manually reversible means for actuating said valve members, a pair of by-pass valves which, when open, connect said reservoir with the two pipe lines, respectively, and a slipping friction clutch device movable with said manually reversible means to open one or the other of said first-named valve members and concurrently close one or the other of the by-pass valves according to the direction of movement of the manually reversible means, thus placing the corresponding pipe line out of communication with the reservoir, whereby the pressure liquid from the pump is delivered to the said pipe line, and means for concurrently holding the other by-pass valve open, to permit liquid returned from the other pipe line to pass into the reservoir.

2. In a liquid pressure remote control system, the combination with a pair of pipe lines of means including a liquid reservoir and a transmitter pump for energization of said pipe lines, said transmitter pump comprising a piston and cylinder pump and valve means including a pair of valve members for placing said pump in communication with a selected one of said pipe lines, a pair of by-pass valves which, when open, connect said reservoir with the two pipe lines, respectively, a manually rotatable slipping friction clutch device arranged to open one or the other of said first-named valve members and concurrently close one or the other of the by-pass valves according to the direction in which the clutch device is rotated, thus causing the corresponding pipe line to be placed out of communication with the reservoir, and concurrently causing the pressure liquid from the pump to be delivered to the said pipe lines, and means for concurrently holding the other by-pass valve open, to permit liquid returned from the other pipe line to pass into the reservoir.

3. A liquid pressure remote control system as claimed in claim 2 wherein the connections between the clutch device and the by-pass valves allow that particular by-pass valve which has been closed to re-open in advance of return of the clutch to the original position.

4. A liquid pressure remote control system as claimed in claim 2, wherein the by-pass valves are of piston form and are spring influenced to return the clutch device to a central inoperative position in which both by-pass valves are open.

EDWARD CLAUDE SHAKESPEARE CLENCH.